No. 894,719.　　　　　　　　　　　　　　PATENTED JULY 28, 1908.
F. BEEMER.
GEARING FOR MOTOR VEHICLES.
APPLICATION FILED JUNE 19, 1907.

4 SHEETS—SHEET 1.

WITNESSES:　　　　　　　　　　　　　　　　INVENTOR
　　　　　　　　　　　　　　　　　　　　　Frank Beemer
　　　　　　　　　　　　　　　　　　　　　　　BY
　　　　　　　　　　　　　　　　　　Augustus B Stoughton
　　　　　　　　　　　　　　　　　　　　　　ATTORNEY.

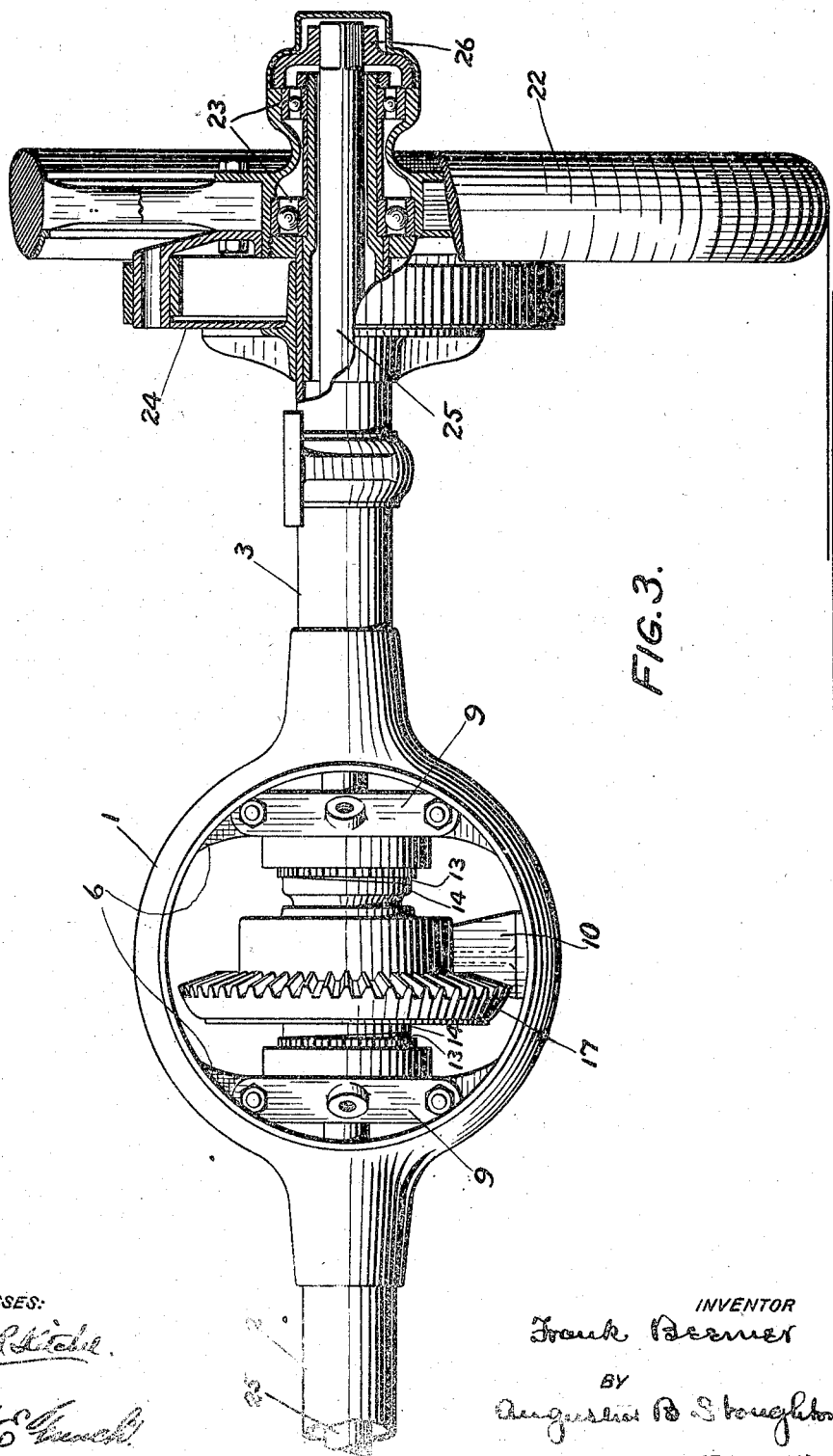

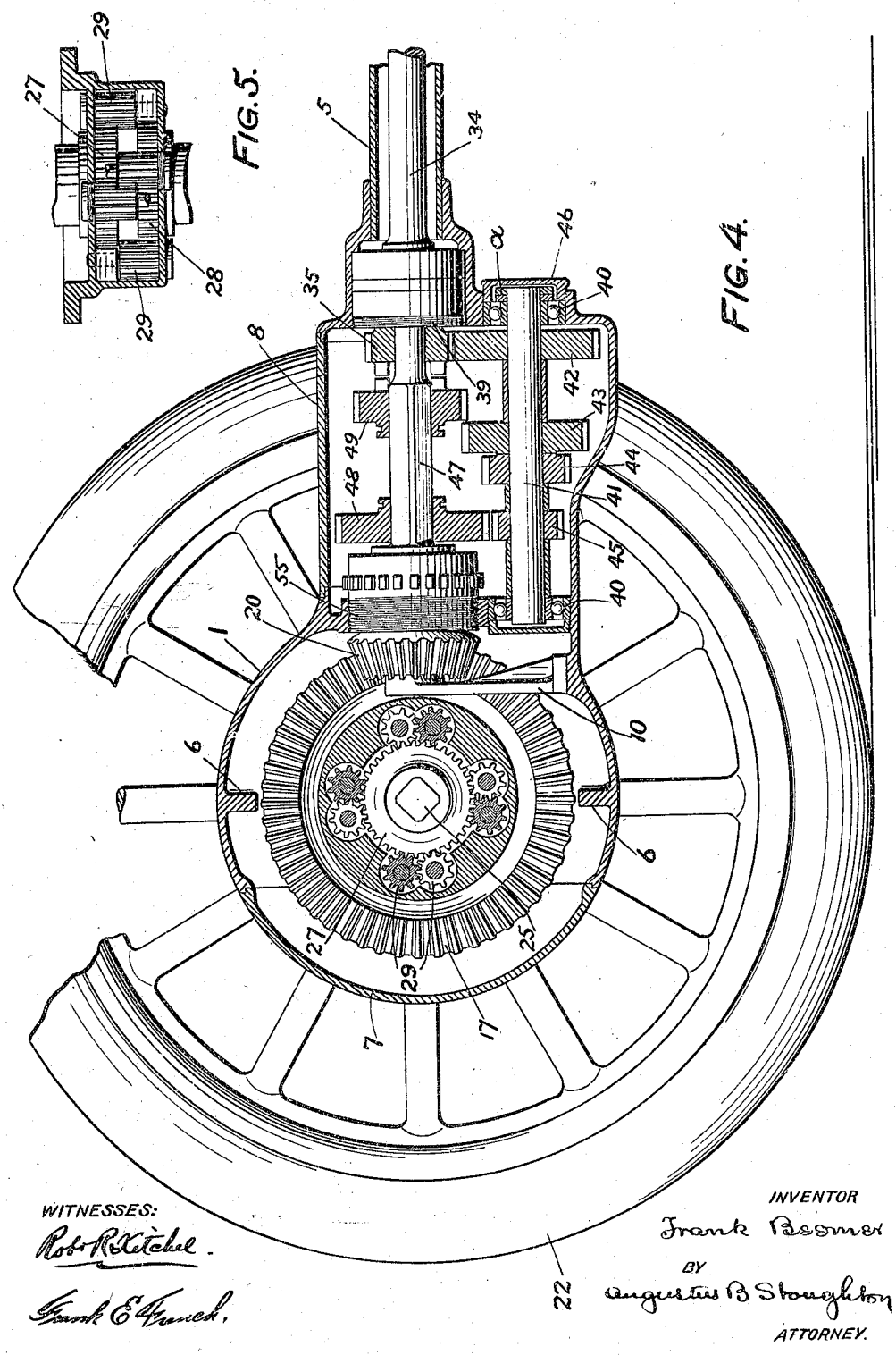

No. 894,719. PATENTED JULY 28, 1908.
F. BEEMER.
GEARING FOR MOTOR VEHICLES.
APPLICATION FILED JUNE 19, 1907.

4 SHEETS—SHEET 4.

WITNESSES:

INVENTOR
Frank Beemer
BY
Augustus B Stoughton
ATTORNEY

UNITED STATES PATENT OFFICE.

FRANK BEEMER, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

GEARING FOR MOTOR-VEHICLES.

No. 894,719.    Specification of Letters Patent.    Patented July 28, 1908.

Application filed June 19, 1907. Serial No. 379,741.

*To all whom it may concern:*

Be it known that I, FRANK BEEMER, a citizen of the United States, residing at the city of Philadelphia, in the county of Philadelphia and State of Pennsylvania, have invented certain new and useful Improvements in Gearing for Motor-Vehicles, of which the following is a specification.

Objects of the present invention are to provide a compact, strong, efficient and durable construction and arrangement of the transmission and speed changing parts; to provide for arranging and supporting the revoluble parts in such manner that they are held in proper mechanical alinement; to provide for ready access to and removal of the parts of the differential and speed changing mechanisms; to provide for efficiently and satisfactorily supporting the differential and speed changing mechanisms in proximity with the driven axle and with each other; to provide convenient and reliable means for adjusting the bevel gears of the differential and speed changing mechanisms in respect to each other so that proper meshing thereof can be secured and maintained; to provide a single structure comprising within itself all of the mechanism between the engine shaft and the wheels and which structure can be sold as a complete article and readily assembled with other parts to make a complete motor vehicle; and another object of the invention is to simplify the means for supporting the parts which are pivotally connected with the rear axle.

To these and other ends hereinafter set forth, the invention comprises the improvements to be presently described and finally claimed.

Figures 1, 2:
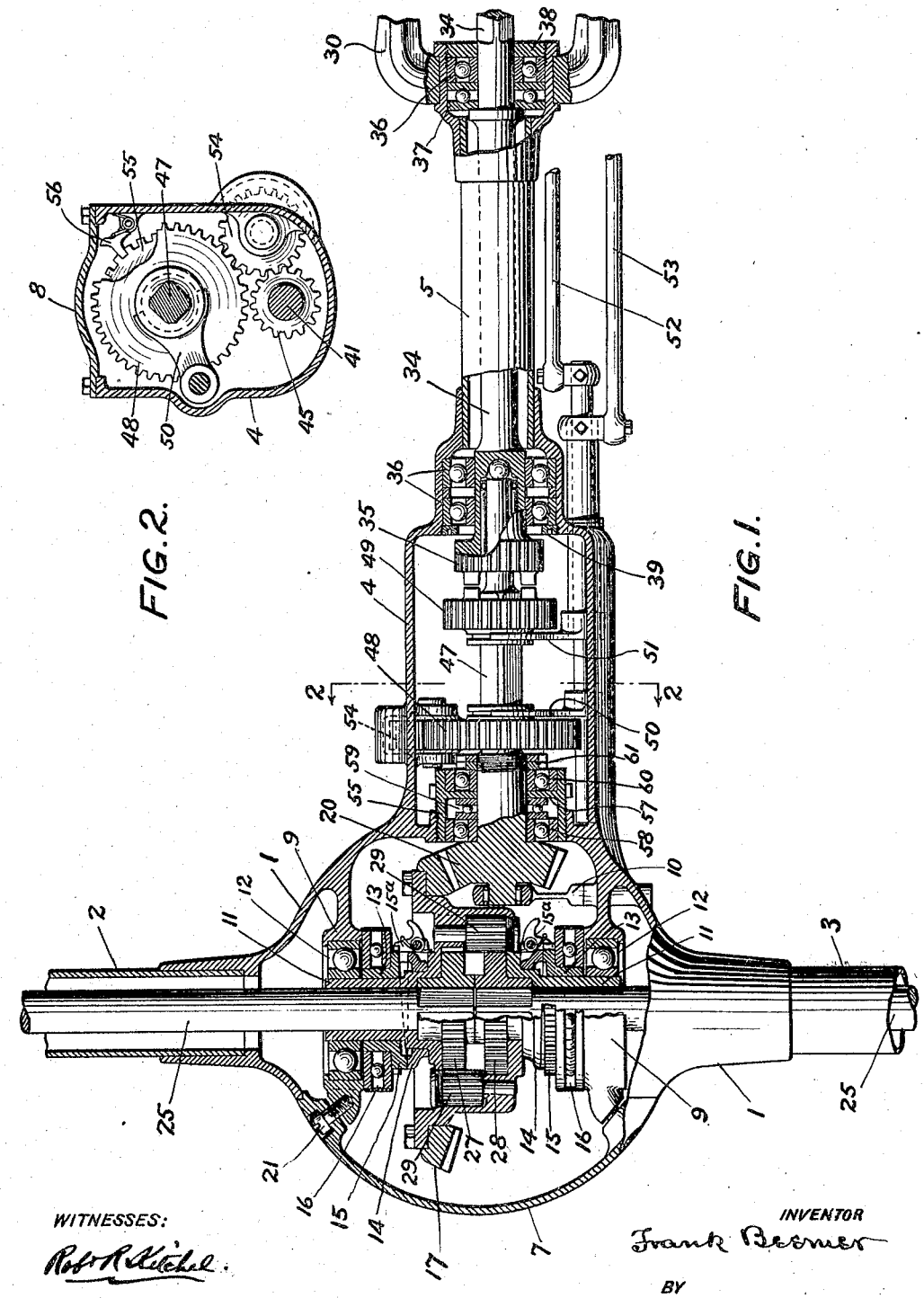
Figure 6:
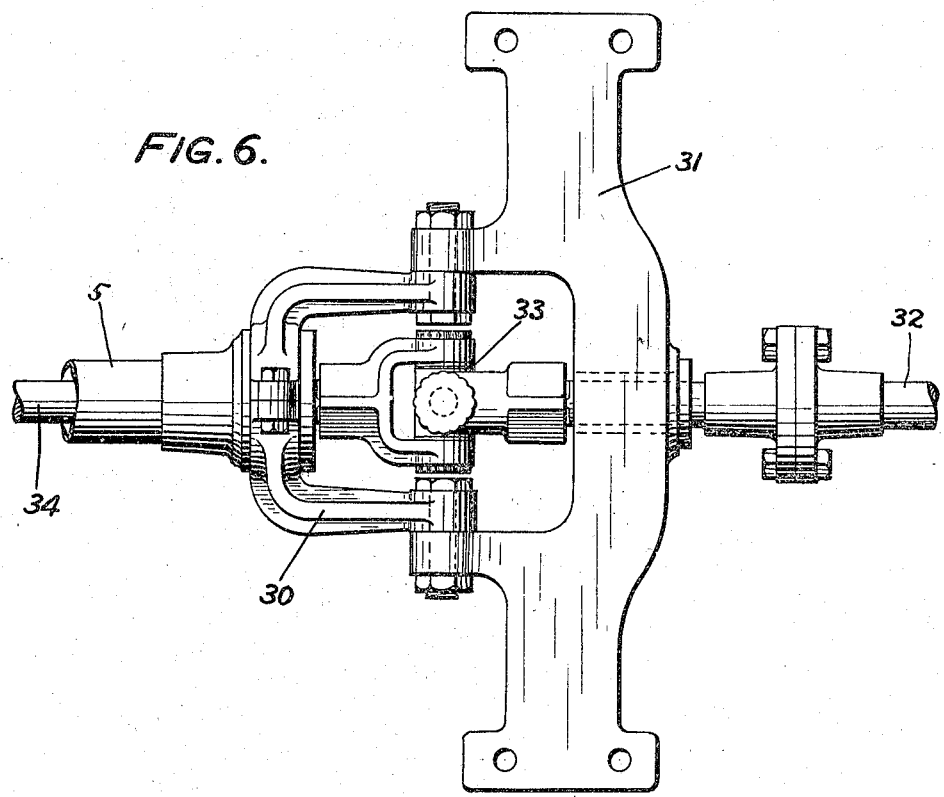
Figure 7:
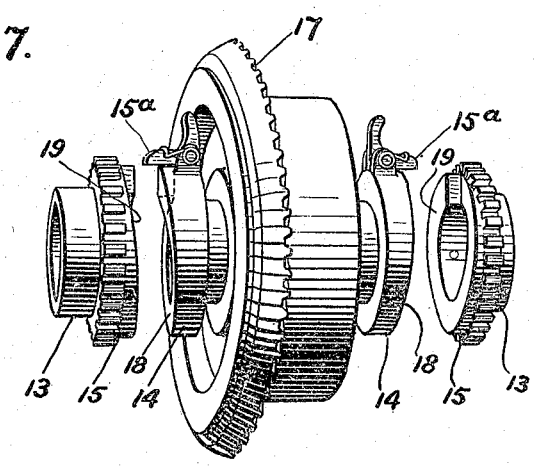

The nature, characteristic features and scope of my invention will be more fully understood from the following description taken in connection with the accompanying drawings forming part hereof and in which Figure 1, is a top or plan view, partly in section, illustrating gearing embodying features of the invention. Fig. 2, is a sectional view taken on the line 2—2, of Fig. 1, and showing means for maintaining certain of the parts in adjusted position. Fig. 3, is a rear view, partly in section, illustrating portions of the gearing embodying features of the invention. Fig. 4, is an elevational view, partly in section, illustrating the gearing. Fig. 5, is a horizontal sectional view illustrating differential mechanism. Fig. 6, is a top or plan view of portions of the gearing which are omitted from Fig. 1, for lack of room, and Fig. 7, is a perspective view illustrating parts comprising an adjustment for the bevel gear of the differential mechanism.

In the drawings 1, is a generally spherical casing having tubular lateral extensions 2 and 3, and a forwardly extending housing 4, provided with a forwardly extending tubular support 5, arranged at right angles with and centrally of the lateral extensions 2 and 3. Within the spherical casing there are crosswise ranging ribs 6, which serve to strengthen it.

7, is a detachable cover for an opening in the rear of the casing and through which the mechanism to be described can be reached and if necessary removed.

8, is a detachable cover for an opening in the housing 4, through which access may be had to the speed changing mechanism.

Within the casing 1, there are formed ribs or webs that carry two-part bearings or bearing supports 9, and there is also a standard or bracket 10, which constitutes a bearing or bearing support. The hubs 11, of the casing or housing of the differential mechanism are arranged in these two-part bearings 9. An annular ball bearing 12, is shown interposed between the hubs and the bearing supports. Collars 13 and 14, each having cam faced ends are arranged on the hubs of the housing of the differential mechanism. Upon one of the collars 13, is arranged an end thrust ball bearing 16, so that this bearing is interposed between the support 9, and a flange 15, on the collar. The other collar 14, abuts on the housing of the differential mechanism. One of the collars, in the present instance 13, is provided with teeth, and the other collar, in this instance 14, is provided with a dog 15$^a$, adapted to take into these teeth. By turning the pairs of collars 13 and 14, in respect to each other it is possible to shift the housing of the differential mechanism which carries the bevel wheel 17, in one direction or the other between the supports 9. This adjustment is effected by the cam faces 18 and 19, and when completed the dogs by engaging the teeth prevent further relative movement of the collars and thus positively maintain the adjustment. The adjustment may be readily made and it will be understood that its purpose is to bring the bevel gear 17, into proper mesh with the bevel gear 20. Screws 21, taking into suitably tapped openings in the supports 9, are shown for detachably holding the cover 7. The wheels 22, are arranged to run on annular bearings 23, interposed between them and the lateral extensions 2 and 3, or continuations thereof.

24, is band brake mechanism.

25, are the live axles which are connected with the hubs as by means of hub clutches 26, and have their squared inner ends arranged in corresponding openings in the two larger wheels 27 and 28, of the differential mechanism. These wheels 27 and 28, mesh with smaller pinions 29, journaled upon studs arranged upon alternate sides of the housing of the differential mechanism. These pinions intermesh with each other in pairs but each one of each pair engages with only one of the large wheels 27 and 28. The front end of the tubular support 5, is provided with a yoke 30, which is pivotally or movably connected with and supported by a bracket 31, that can be attached to a suitable portion of the chassis.

32, is the engine shaft or a continuation thereof, and it is journaled for revolution in an appropriate manner and is connected with the universal joint 33.

34, is a drive shaft. It is connected at one end with the universal joint and at the other end is fitted with a pocket and with a gear 35. This drive shaft is arranged through the tubular support 5, which at its ends is fitted with annular bearings 36, and at its front end with a thrust bearing 37. The last named bearings are arranged in recesses in the tubular support and are held to place therein by screw rings 38 and 39. There is a shoulder on the drive shaft which abuts on the end thrust bearing 37. By screwing the parts 38 and 39, it is possible to shift the drive shaft 34, endwise for a purpose which will be hereinafter described. Within the forwardly extending housing 4, there is revolubly mounted by means of annular bearings 40, a shaft 41, upon which are carried the speed gears 42, 43, 44, and 45. By removing the cover 46, access may be had to the adjusting collars a, of the shaft 41.

There is a speed shaft 47, one end of which is fast to the bevel gear 20, and the other end of which is supported by a roller bearing and a ball arranged in the end of the drive shaft 34. This shaft 47, is squared and on it are slidably mounted the speed gears 48 and 49, which can be shifted by means of the forks 50 and 51, the shanks of which are sleeved together and connected with operating links 52, and 53. There is a backing gear wheel 54, journaled on a shaft, the ends of which are supported by brackets projecting inward from the wall of the housing 4. The gear wheel 35, drives all the wheels on the con ter-shaft 41. The wheel 45, drives the backing gear 54. By sliding the gears 48 or 49 into or out of mesh with the wheels 44, 43, or 54, it is possible to drive ahead with two speeds or backwards with one speed. By bringing the gear wheel 49 into such position that its clutch member engages the clutch member on the gear wheel 35, it is possible to run ahead with the full speed of the engine. Gear wheel 48 meshes only with the gear wheel 54 when it is necessary to back the vehicle and with the gear wheel 44, for the first forward speed. The gear wheel 49 meshes with the gear wheel 43 for the second speed ahead. None of these wheels are shifted into engagement with another wheel and then past it. Any speed can be obtained without going through other speeds. The mechanism is selective in the sense that any speed can be obtained without the necessity of passing through the other speeds. For example, it is possible to go from the highest to the lowest speed without going through the intervening speeds. There is a bushing 55, which is screwed into a tapped opening arranged within the spherical casing 1. Externally this bushing is provided with teeth that may be engaged by a dog 56, Fig. 2, so that the bushing may be screwed back and forth and then locked to place by the dog. Internally this bushing is provided with a flange 57 arranged intermediate of its ends. To one side of the flange is arranged an annular ball bearing 58 and a ball thrust bearing 59. To the other side of the flange is arranged an annular ball bearing 60, and jam nuts or locking collars 61, that are secured in the present instance by a screw thread to the speed shaft 57. The bushing 55, may be screwed in one direction or the other. It carries with it the beveled gear 20, so that the beveled gear may in this way be adjusted in respect to the bevel gear 17, thus insuring proper meshing or running of the two gears. This adjustment may be compensated for by suitably shifting the rings 35 and 38, which causes the drive shaft 34, to maintain its proper relation in respect to the speed shaft 47.

What I claim is:

1. In motor vehicle gearing the combination of a driven gear wheel, bearing supports for the same, and a pair of cam faced collars whereof one is provided with a latch and the other with teeth whereby the gear wheel may be shifted and held in proper position, substantially as described.

2. The combination in motor vehicle gearing of a speed shaft, a driving gear wheel thereon, a driven gear wheel, a casing containing said gear wheels, a bushing having screw thread connection with said casing and in which the speed shaft is revolubly and endwise immovably held, teeth on the bushing, and a dog or detent for the teeth, substantially as described.

3. The combination in motor vehicle gearing of a speed shaft, a driving gear wheel thereon, a driven gear wheel, a casing containing said gear wheels, a bushing having screw thread connection with said casing and in which the speed shaft is revolubly and endwise immovably held, and means for locking the bushing against turning, substantially as described.

4. The combination in motor vehicle gearing of a casing provided with a forwardly extending housing having a tubular support, a speed shaft arranged in the housing, a driving shaft arranged in the tubular support, said shafts fitting the one within the other and abutting endwise, a driving gear wheel on the speed shaft and in the casing, a differential mechanism driven gear wheel, a bushing having screw thread connection with the casing and provided with teeth, a dog adapted to engage the teeth for holding the bushing, provisions between the bushing and speed shaft at one end thereof whereby the speed shaft is moved endwise with the bushing, bearings for the engine shaft, and supports having screw thread connection with the tubular extension for adjusting the last mentioned bearings when the bushing is adjusted, substantially as described.

5. The combination in motor vehicle gearing of a single housing consisting of one piece and having integral bearings, a differential mechanism supported by some of said bearings and arranged in said housing, speed changing mechanism supported by some of said bearings and arranged in said housing and comprising counter-gear wheels and slidable gear wheels arranged respectively to mesh with one only of the first mentioned gears whereby speed changes are obtained without passing the sliding gears through the counter-gears, and a beveled pinion and gear interposed between said speed and differential mechanisms, substantially as described.

6. The combination in motor vehicle gearing of a single housing consisting of one piece and having integral bearings, a differential mechanism supported by some of said bearings and arranged in said housing, speed changing mechanism supported by some of said bearings and arranged in said housing and comprising counter-gear wheels and slidable gear wheels arranged respectively to mesh with one only of the first mentioned gears whereby speed changes are obtained without passing the sliding gears through the counter-gears, a beveled pinion and gear interposed between said speed and differential mechanisms, and a backing gear wheel revolubly mounted upon a fixed support and driven from one of said counter-gears and arranged to receive one of said sliding gears in mesh, substantially as described.

7. The combination in motor vehicle gearing of a single housing having bearings, a differential mechanism supported by some of said bearings and arranged in said housing, speed changing mechanism supported by some of said bearings and arranged in said housing and comprising counter-gear wheels and slidable gear wheels arranged respectively to mesh with one only of the first mentioned gears whereby speed changes are obtained without passing the sliding gears through the counter-gears, and a beveled pinion and gear interposed between said speed and differential mechanisms, substantially as described.

8. The combination in motor vehicle gearing of a single housing having bearings, a differential mechanism supported by some of said bearings and arranged in said housing, speed changing mechanism supported by some of said bearings and arranged in said housing and comprising counter-gear wheels and slidable gear wheels arranged respectively to mesh with one only of the first mentioned gears whereby speed changes are obtained without passing the sliding gears through the counter-gears, a beveled pinion and gear interposed between said speed and differential mechanisms, and a backing gear wheel revolubly mounted upon a fixed support and driven from one of said counter-gears and arranged to receive one of said sliding gears in mesh, substantially as described.

9. The combination in motor vehicle gearing of differential and speed changing mechanisms interconnected and arranged in proximity with each other, bearings for said parts, and a housing inclosing said parts and all the walls of which are continuous around and between all said bearings, substantially as described.

In testimony whereof I have hereunto signed my name.

FRANK BEEMER.

Witnesses:
 CLIFFORD H. CASSEL,
 FRANK F. FRENCH.